United States Patent
Takeda

(10) Patent No.: US 9,628,680 B2
(45) Date of Patent: *Apr. 18, 2017

(54) METHOD OF MANUFACTURING VEHICLE-MOUNTED CAMERA HOUSING, VEHICLE-MOUNTED CAMERA HOUSING, AND VEHICLE-MOUNTED CAMERA

(71) Applicant: NIDEC ELESYS CORPORATION, Kawasaki-shi, Kanagawa (JP)

(72) Inventor: Naoya Takeda, Kawasaki (JP)

(73) Assignee: NIDEC ELESYS CORPORATION, Kanagawa (JP)

( * ) Notice: Subject to any disclaimer, the term of this patent is extended or adjusted under 35 U.S.C. 154(b) by 270 days.

This patent is subject to a terminal disclaimer.

(21) Appl. No.: 14/658,452

(22) Filed: Mar. 16, 2015

(65) Prior Publication Data

US 2015/0264230 A1    Sep. 17, 2015

(30) Foreign Application Priority Data

Mar. 17, 2014 (JP) ................................ 2014-053824
Jan. 9, 2015 (JP) ................................ 2015-002761

(51) Int. Cl.
*H04N 5/225* (2006.01)
*B60R 11/04* (2006.01)
(Continued)

(52) U.S. Cl.
CPC .......... *H04N 5/2252* (2013.01); *B60R 11/04* (2013.01); *G01B 11/26* (2013.01); *G06T 7/001* (2013.01);
(Continued)

(58) Field of Classification Search
None
See application file for complete search history.

(56) References Cited

U.S. PATENT DOCUMENTS 7,480,149 B2 * 1/2009 DeWard ................. B60R 11/04
340/438
2009/0295181 A1 * 12/2009 Lawlor ..................... B60R 1/12
296/1.11

(Continued)

FOREIGN PATENT DOCUMENTS

JP    2010-089745 A    4/2010

OTHER PUBLICATIONS

Onishi, M. ; "Vehicle-Mounted Camera and Method of Manufacturing Vehicle-Mounted Camera," U.S. Appl. No. 15/248,156, filed Aug. 26, 2016.

(Continued)

*Primary Examiner* — Twyler Haskins
*Assistant Examiner* — Wesley Chiu
(74) *Attorney, Agent, or Firm* — Keating & Bennett, LLP

(57) ABSTRACT

A method of manufacturing a vehicle-mounted camera housing including a cover housing, a camera main body and a circuit board includes providing a set of partial molds which are combined to form an internal cavity. When the combined partial molds are separated, an intermediate member is taken out and machined to obtain the cover housing. A top plate portion of the cover housing includes a pedestal extending downward. The machining includes cutting a distal end of the pedestal such that a flat face of the pedestal faces a predetermined direction with reference to an inclination angle of a windshield of a target vehicle, a relative direction of an optical axis of the camera, relative directions of the pedestal flat face and an upper surface of the top plate portion, and relative directions of the top plate and the windshield surface.

49 Claims, 10 Drawing Sheets

(51) Int. Cl.
*G01B 11/26* (2006.01)
*G06T 7/00* (2017.01)
*H04N 7/18* (2006.01)
*B60R 11/00* (2006.01)

(52) U.S. Cl.
CPC ...... *H04N 7/183* (2013.01); *B60R 2011/0026* (2013.01); *Y10T 29/49002* (2015.01)

(56) References Cited

U.S. PATENT DOCUMENTS

| | | | | |
|---|---|---|---|---|
| 2014/0160284 | A1* | 6/2014 | Achenbach | H04N 5/2251 348/143 |
| 2014/0313337 | A1* | 10/2014 | Devota | B60R 11/04 348/148 |
| 2015/0015713 | A1* | 1/2015 | Wang | H04N 5/235 348/148 |
| 2015/0042798 | A1* | 2/2015 | Takeda | H04N 5/2252 348/148 |
| 2015/0042804 | A1* | 2/2015 | Okuda | B60R 11/04 348/148 |
| 2015/0042874 | A1* | 2/2015 | Takeda | B60R 11/04 348/374 |
| 2016/0023620 | A1* | 1/2016 | Matori | B60R 11/04 348/148 |
| 2016/0144797 | A1* | 5/2016 | Hoellt | B60R 11/04 348/148 |
| 2016/0375828 | A1* | 12/2016 | Yun | B60S 1/54 701/48 |

OTHER PUBLICATIONS

Takeda, N.; "Vehicle-Mounted Camera, Method of Manufacturing Vehicle-Mounted Camera, and Method of Manufacturing Vehicle Body," U.S. Appl. No. 15/067,503, filed Mar. 11, 2016.
Takeda, N.; "Method of Manufacturing Vehicle-Mounted Camera Housing, Vehicle-Mounted Camera Housing, and Vehicle-Mounted Camera," U.S. Appl. No. 15/181,626, filed Jun. 14, 2016.
Takehara, Y., "Method of Attaching Vehicle-Mounted Camera," U.S. Appl. No. 15/248,141, filed Aug. 26, 2016.
Takehara, Y., "Method of Manufacturing Vehicle," U.S. Appl. No. 15/248,149, filed Aug. 26, 2016.

* cited by examiner

METHOD OF MANUFACTURING VEHICLE-MOUNTED CAMERA HOUSING, VEHICLE-MOUNTED CAMERA HOUSING, AND VEHICLE-MOUNTED CAMERA

BACKGROUND OF THE INVENTION

1. Field of the Invention

The present invention relates to a method of manufacturing a vehicle-mounted camera housing of a vehicle-mounted apparatus attached to various car models, a vehicle-mounted camera housing, and a vehicle-mounted camera.

2. Description of the Related Art

Conventionally, there has been used a vehicle-mounted camera that applies image processing to an image picked up by a camera attached to a vehicle to extract information regarding a traffic lane on a road surface, a preceding vehicle, an oncoming vehicle, a person, or a road sign from the image. The vehicle-mounted camera is used with a vehicle-mounted system that supports safe traveling of the vehicle and a monitoring system that monitors intrusion of suspicious persons.

In recent years, a variety of sensors such as a rain sensor, an illuminance sensor, a millimeter wave or laser radar sensor have been mounted on vehicles. Therefore, an attachment space for the vehicle-mounted camera is required to be reduced. Further, the vehicle-mounted camera needs to be prevented from hindering driving of a driver, for example, blocking the visual field of the driver or giving an oppressive feeling to the driver. To lighten such feeling, the vehicle-mounted camera is attached to the upper area of a windshield of the vehicle with an inclined posture along the sloping surface of the windshield.

When the vehicle-mounted camera is attached to the vehicle, angle adjustment (optical axis adjustment) needs to be performed (see Japanese Patent Application Laid-Open No. 2010-89745). Japanese Patent Application Laid-Open No. 2010-89745 discloses an optical axis adjustment system including a driving device to adjust the posture of a vehicle-mounted camera through operation from the outside and a retaining device to retain the driving device in a predetermined position.

However, in the invention disclosed in Japanese Patent Application Laid-Open No. 2010-89745, since the optical axis adjustment system includes an angle adjustment mechanism such as the driving device and the retaining device, the number of components increases and the structure of the optical axis adjustment system is complicated. Further, in the invention disclosed in Japanese Patent Application Laid-Open No. 2010-89745, labor to adjust the angle adjustment mechanism (angle adjustment labor) is necessary. As a result, the invention disclosed in Japanese Patent Application Laid-Open No. 2010-89745 causes an increase in the cost of the vehicle-mounted camera.

SUMMARY OF THE INVENTION

Preferred embodiments of the present invention solve the problems described above and provide a method of manufacturing a vehicle-mounted camera housing and a vehicle-mounted camera housing with a simple structure that reduces the labor needed to adjust an angle of the vehicle-mounted camera housing.

A method of manufacturing a vehicle-mounted camera housing according to a preferred embodiment of the present invention includes manufacturing a vehicle-mounted camera including a cover housing including a tabular top plate portion, a camera main body portion fixed to the cover housing, and a circuit board connected to the camera main body portion, the vehicle-mounted camera configured to be attached to a windshield and used in a posture in which the top plate portion extends along the windshield. In the method of manufacturing the vehicle-mounted camera, a set of molds including two or more partial molds are prepared. When the partial molds are combined, an internal cavity including a tabular portion sandwiched by inner surfaces of the partial molds is obtained. The partial molds are combined to define the internal cavity. A material in a fluidized state is injected into the cavity, the material is solidified, the combined partial molds are separated, and an intermediate member is taken out. Preferably, at least an upper surface of the top plate portion of the intermediate member is painted. The intermediate member after the painting is subjected to machine work to obtain a cover housing. The camera main body portion is fixed to the cover housing by a fixing member. The circuit board and the camera main body portion are connected. The camera main body portion includes a lens unit. The top plate portion of the cover housing includes a pedestal extending downward. The camera main body portion includes, on a surface thereof, a camera flat face. As used herein, the term "face" shall mean a portion or area of an object other than a portion or area including or defined by an edge or a closed boundary. A pair of inner surfaces of the molds that sandwich the tabular portion in the internal cavity are respectively different surfaces of the partial molds. One of the pair of inner surfaces includes a recessed portion. The depth of the recessed portion measured with reference to the flat portion of the one inner surface is larger than the height of the pedestal. The machine work cuts at least a portion of the painted surface of the intermediate member. The machine work includes machining to cut the distal end of the pedestal and forming a pedestal flat face, which is a flat face facing a predetermined direction. In a state in which the camera main body portion is fixed to the cover housing, the pedestal flat face and the camera flat face are in contact with each other. The predetermined direction is determined with reference to an inclination angle of the windshield of a target vehicle body, a relative direction of the optical axis of the lens unit with respect to the camera flat face, relative directions of the pedestal flat face and the upper face of the top plate portion, and relative directions of the top plate and the windshield surface in a state in which the vehicle-mounted camera is attached to the windshield.

The method of manufacturing the vehicle-mounted camera housing and the vehicle-mounted camera housing according to a preferred embodiment of the present invention do not need to include an optical axis adjustment mechanism having a large angle adjustment width. Therefore, it is possible to provide a small vehicle-mounted camera housing.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
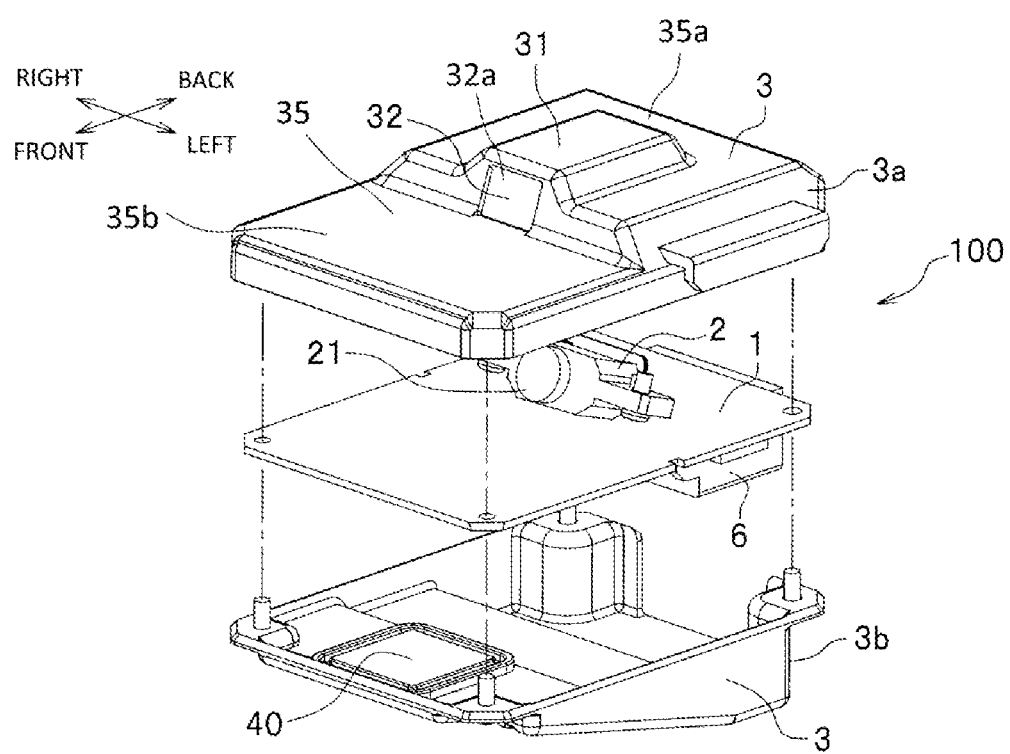
FIG. 1 is an exploded perspective view showing the overall configuration of a vehicle-mounted camera according to a preferred embodiment of the present invention.

Preferred embodiments of the present invention will be explained in detail below with reference to the drawings as appropriate. Note that sizes, positional relations, and the like of members and the like shown in the drawings are sometimes exaggerated in order to clarify the explanation.

A housing (a vehicle-mounted camera housing) 3 according to a preferred embodiment of the present invention is a general-purpose housing for vehicle-mounted apparatuses that are configured to be attached to various car models. As shown in FIG. 1, in the present preferred embodiment, the housing 3 is included in a vehicle-mounted camera (a vehicle-mounted apparatus) 100.

First, the overall configuration of the vehicle-mounted camera 100 is explained with reference to FIGS. 1 to 3.

Figure 2:
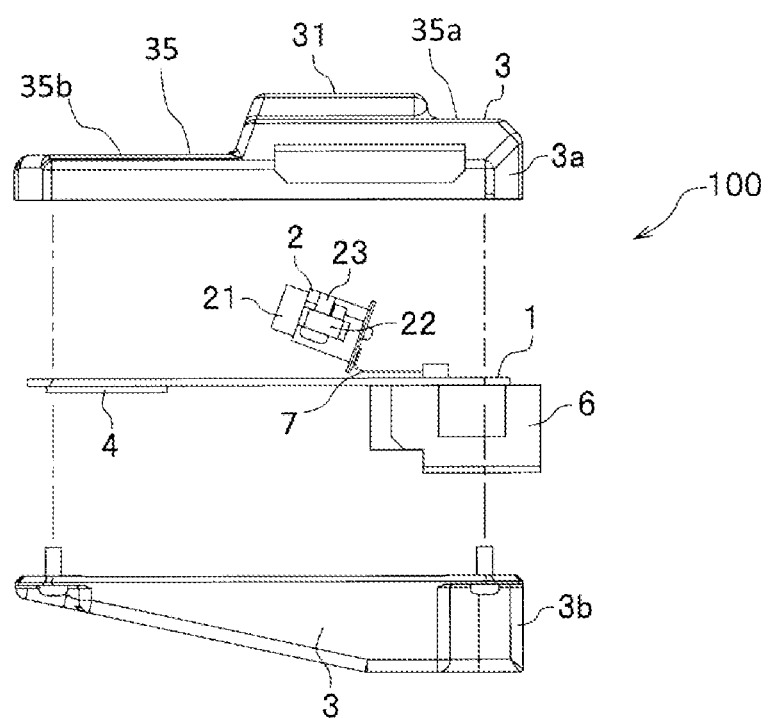
FIG. 2 is an exploded side view showing the overall configuration of the vehicle-mounted camera according to a preferred embodiment of the present invention.
Figure 3:
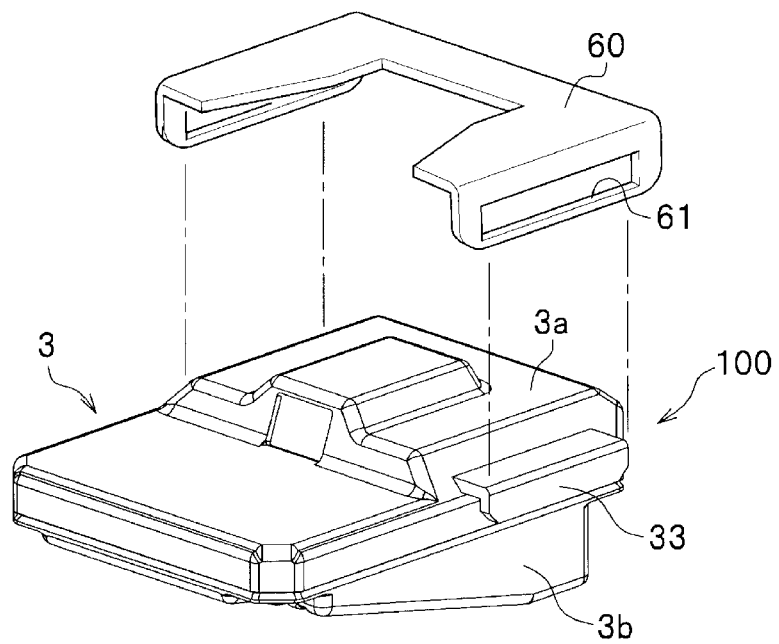
FIG. 3 is a perspective view showing the external configuration of the vehicle-mounted camera according to a preferred embodiment of the present invention.

As shown in FIGS. 1 to 3, the vehicle-mounted camera 100 picks up a video stream of images during traveling. The vehicle-mounted camera 100 includes a circuit board 1, a camera main body portion (a vehicle-mounted apparatus main body portion) 2, and the housing 3 that houses the circuit board 1 and the camera main body portion 2.

A camera main body portion 2 preferably takes multiple images in succession to generate a video stream of images, but it may also take a single photograph. The circuit board 1 acquires the video stream of images or the photograph from the camera main body portion 2 and transmits them to another apparatus, or stores or processes the video data or the photograph data. A processing circuit element 4, a connector 6, and the like are mounted on the circuit board 1. The camera main body portion 2 is connected to the circuit board 1 preferably at least by a flexible circuit board 7. Although not shown in the drawings, members necessary for the vehicle-mounted camera 100 to operate such as a power supply circuit element, a capacitor, a microcomputer, and an IC are also preferably provided.

In the camera main body portion 2, a lens unit 21 is provided in a cylindrical or substantially cylindrical lens housing portion. The lens unit 21 is disposed to project toward the front of the camera main body portion 2. The focal point of the lens unit 21 is fixed and an image sensor (not shown in the drawings) is located at the focal point on the optical axis of the lens unit 21.

The image sensor captures an image which is projected onto the image sensor. A CMOS type image sensor is preferably used as the image sensor, but other types, including a CCD type image sensor, may also be used.

The camera main body portion 2 is fixed to pedestals 34 (FIG. 6) of a cover housing 3a such that the optical axis of the lens unit 21 faces a reference attachment direction explained below. Note that, for convenience, the camera main body portion 2 is shown in a state in which the camera main body portion 2 is separated from the cover housing 3a.

Specifically, the camera main body portion 2 includes, in the rear thereof, a protrusion fixing portion 22, which is an element extending in a direction away from the optical axis, and a fixing member 23, which is preferably a screw, for example, inserted into a hole of the protrusion fixing portion 22. The camera main body portion 2 is fixed to the pedestals 34 by the fixing member 23.

In the present preferred embodiment, the protrusion fixing portion 22 is preferably made of aluminum or an aluminum alloy, for example. The protrusion fixing portion 22 is preferably not painted. A metal surface is exposed on a surface of the protrusion fixing portion 22 in contact with the pedestals 34. However, this configuration is not essential in the present invention. The protrusion fixing portion 22 may be painted as necessary. The protrusion fixing portion 22 may be a member made of resin, for example.

The housing 3 houses the circuit board 1 and the camera main body portion 2. Note that the processing circuit element 4, the connector 6, and the other members either disposed on or connected to the circuit board 1 are also housed in the housing 3.

The housing 3 includes a base housing 3b that supports the circuit board 1, the cover housing 3a that opposes the base housing 3b, and the camera main body portion 2. Examples of the material of the housing 3 include aluminum and an aluminum alloy. Aluminum or an aluminum alloy is preferably used as the material. Resin can also be used as the material of the housing 3.

The cover housing 3a includes a top plate portion 35, which defines a tabular portion. A lower face 36 of the top plate portion 35 includes the pedestals 34 projecting downward. Details of the pedestals 34 are explained below.

The cover housing 3a includes a lens window portion 31 projecting upward from the top plate portion 35.

The lens window portion 31 includes a lens window portion opening 32 that is a hole opened to the front side. The optical axis of the lens unit 21 extends through the lens window portion 31. The camera main body portion 2 captures an image of the vehicle outside through the lens window portion opening 32. The lens window portion opening 32 is closed by transparent glass 32a to prevent intrusion of dust to the inner side of the housing 3.

Figure 4:
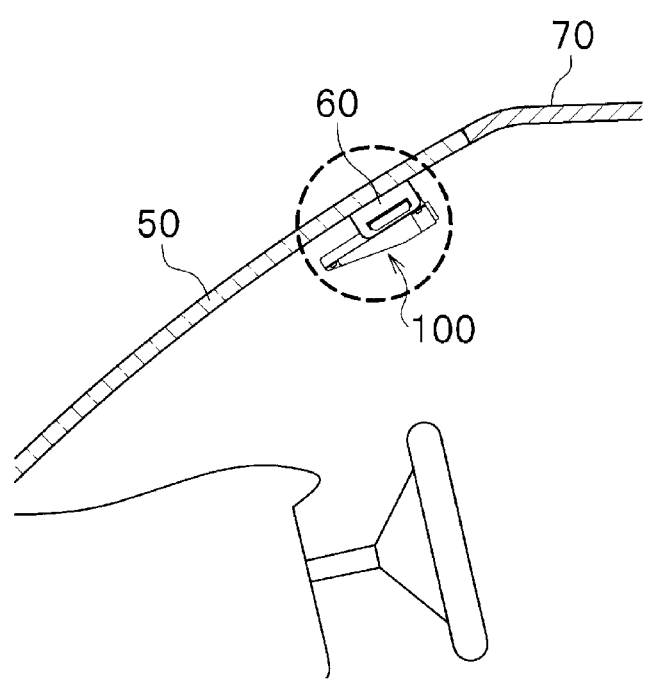
FIG. 4 is a schematic diagram showing a state in which the vehicle-mounted camera is attached to a windshield of a vehicle according to a preferred embodiment of the present invention.

Note that, as explained below, the pedestals 34 are located at different heights according to an angle of the windshield 50 (FIG. 4). An opening area of the lens window portion opening 32 is desirably large taking into account the fact that the height of the pedestals 34 is different.

In the present preferred embodiment, the cover housing 3a preferably includes the lens window portion 31. However, the lens window portion 31 is not essential in the present invention. In the present preferred embodiment, preferably only components lower than the camera main body portion 2 are disposed on the upper side of the circuit board 1. Therefore, the lens window portion 31 projects upward from the top plate portion 35 to attain a reduction in the size of the cover housing 3*a*. However, a configuration in which electronic components and connectors approximately as high as the camera main body portion 2 are disposed on the upper side of the circuit board 1 may also be used in a preferred embodiment of the present invention. In that case, it is desirable to align the upper face of the top plate portion 35 and the upper face of the lens window portion 31. In such a preferred embodiment, the lens window portion 31 is omitted but the lens window portion opening 32 is preferably included.

The top plate portion 35 includes a top plate rear portion 35*a* located on the rear side of the lens window portion opening 32 and a top plate front portion 35*b* located on the front side of the lens window portion opening 32. The top plate front portion 35*b* is located at a position lower than the top plate rear portion 35*a*. The visual field of the lens unit 21 is secured by this structure. The pedestals 34 are located in a lower face rear portion 36*a* of the top plate rear portion 35*a* on the lower face 36 of the top plate portion 35. A lower face front portion 36*b* is preferably flat. The lower face rear portion 36*a* includes a flat portion, a recess, which defines the lens window portion 31, and the pedestals 34. In this example, two pedestals 34 are preferably provided. However, three or more pedestals 34 may be provided, for example.

In the base housing 3*b*, an open portion is provided in the rear of the base housing 3*b* such that a predetermined portion of the connector 6 is provided in the base housing 3*b* when the circuit board 1 is attached. Note that a rear portion of the connector 6 is exposed to the outer surface from the rear of the base housing 3*b*.

A heat conduction portion 40 is preferably provided as a portion of the base housing 3*b* in a portion where the processing circuit element 4 is located. The heat conduction portion 40 may be provided as a separate member. The bottom face of the base housing 3*b* is inclined such that the housing thickness decreases from a predetermined position at the rear end toward the front end.

In the housing 3, the cover housing 3*a* and the base housing 3*b* are opposed to each other and configured to be joined together (see FIG. 3). In this state, since the cover housing 3*a* and the base housing 3*b* have the shapes explained above, the housing 3 is configured such that the housing thickness decreases from the distal end position of the lens window portion 31 toward the distal end of the housing 3.

The elements and the like mounted on the circuit board 1 are explained below.

The processing circuit element 4 is configured or programmed to process images captured by the image sensor. The processing circuit element 4 is preferably provided on the lower face of the circuit board 1. The processing circuit element 4 is configured or programmed to perform processing to extract various characteristic objects such as a vehicle, a pedestrian, and a traffic lane from the images.

The processing circuit element 4 is preferably in contact with the base housing 3*b* via the heat conduction portion 40.

The heat conduction portion 40 is a portion of the base housing 3*b* and includes a flat upper face. The surface of the processing circuit element 4 and the heat conduction portion 40 contact each other via a heat conduction gel, for example, therebetween. The heat conduction gel is preferably a silicone based gel material, but other materials may also be used. The processing circuit element 4 generates a large amount of heat when the vehicle-mounted camera 100 is in operation. But the heat is smoothly dissipated by conducting the heat to the base housing 3*b* through the heat conduction portion 40 and the heat is radiated by the base housing 3*b*.

The connector 6 (a power supply connector) supplies electric power and data communication. The connector 6 is preferably provided in a rear portion on the lower face of the circuit board 1. The connector 6 supplies electric power received from the vehicle to the vehicle-mounted camera 100 and outputs a calculation result of the processing circuit element 4 to the outside.

An attachment state of the vehicle-mounted camera 100 is explained below.

Figure 5:
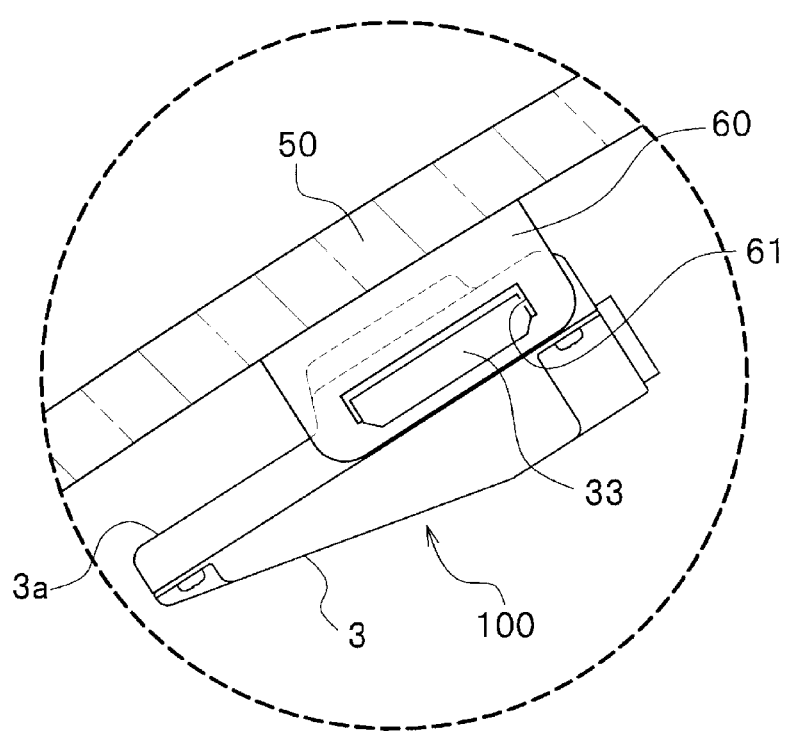
FIG. 5 is an enlarged view of a thick broken line portion in FIG. 4.

As shown in FIGS. 4 and 5, the vehicle-mounted camera 100 is attached on the interior side of the windshield 50 of the vehicle such that the cover housing 3*a* is located adjacent to the windshield 50 and the front face of the vehicle-mounted camera 100 points in an oblique lower direction. That is, the vehicle-mounted camera 100 is attached such that the camera main body portion 2 is adjacent to the windshield 50 and the rear of the vehicle-mounted camera 100 is closer to a ceiling 70 of the vehicle. In this manner, the vehicle-mounted camera 100 is attached such that the housing 3 extends along the windshield 50. Therefore, the vehicle-mounted camera 100 does not hinder the front visual field of the driver.

The vehicle-mounted camera 100 is attached to a predetermined position of the windshield 50 via an attachment member 60. The attachment member 60 is fixed to a predetermined position of the windshield 50, for example, near a rearview mirror using a double-sided tape, an adhesive, or the like. The attachment member 60 includes a through-hole 61 that extends through the side face of the attachment member 60. The vehicle-mounted camera 100 is fixed to the attachment member 60. The vehicle-mounted camera 100 is fixed by hooking a protrusion attachment portion 33 of the cover housing 3*a* in the through-hole 61.

The structure of the pedestals 34 is explained in detail with reference to FIGS. 6 and 7 below (see FIGS. 1 to 5 as appropriate).

Figures 6A, 6B:
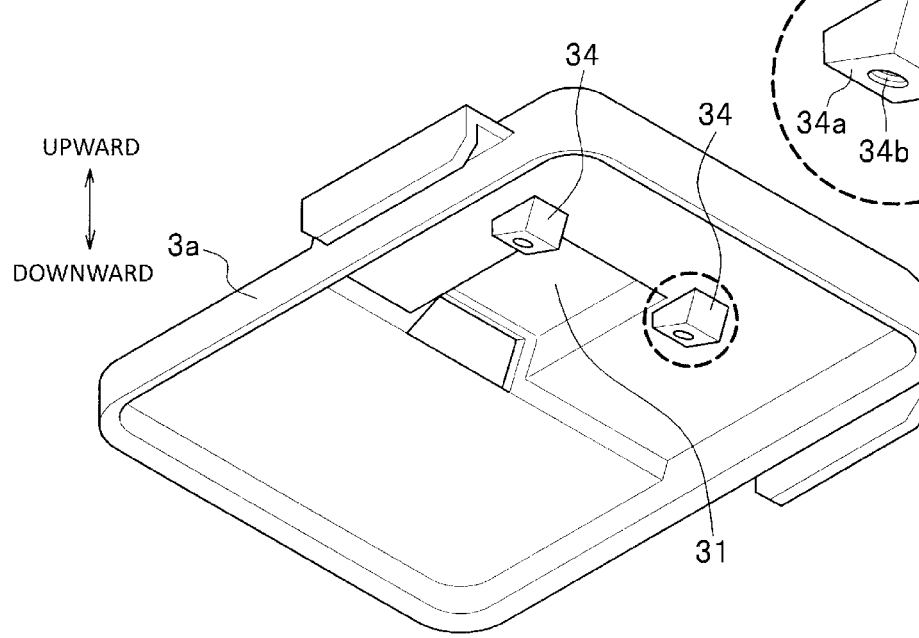
FIG. 6A is a perspective view showing the inner side of a housing according to a preferred embodiment of the present invention.
FIG. 6B is an enlarged view of a thick broken line portion of FIG. 6A.

As shown in FIG. 6, the cover housing 3*a* includes the two pedestals 34 on the inner side. The pedestals 34 preferably have the same shape and the same size though one may be of a different shape or size when using two or more pedestals. The pedestals 34 preferably have, for example, a truncated quadrangular pyramid shape, but other shapes, such as a truncated cone or a simple column shape, may be used. The pedestals 34 are arranged a predetermined space apart from each other to the left and right on the rear side of the lens window portion 31.

The pedestal 34 includes a pedestal flat face 34*a*, which is a flat face with which the protrusion fixing portion 22 of the camera main body portion 2 is in contact. The pedestal flat face 34*a* is preferably formed by cutting (e.g., shaping) the pedestal 34 such that the vehicle-mounted camera 100 is parallel or substantially parallel to a reference attachment direction when the vehicle-mounted camera 100 is attached. A fixing member hole 34*b*, which is preferably a screw hole, for example, is provided in the center of the pedestal flat face 34*a* to receive a screw (e.g., the fixing member 23). The protrusion fixing portion 22 includes a camera flat face 24 on the surface thereof. The camera flat face 24 and the pedestal flat face 34*a* are in contact with each other. The camera main body portion 2 does not always need to include the protrusion fixing portion 22. However, in that case, the camera flat face 24 is preferably provided in some other portion of the camera main body portion 2.

Figure 7:
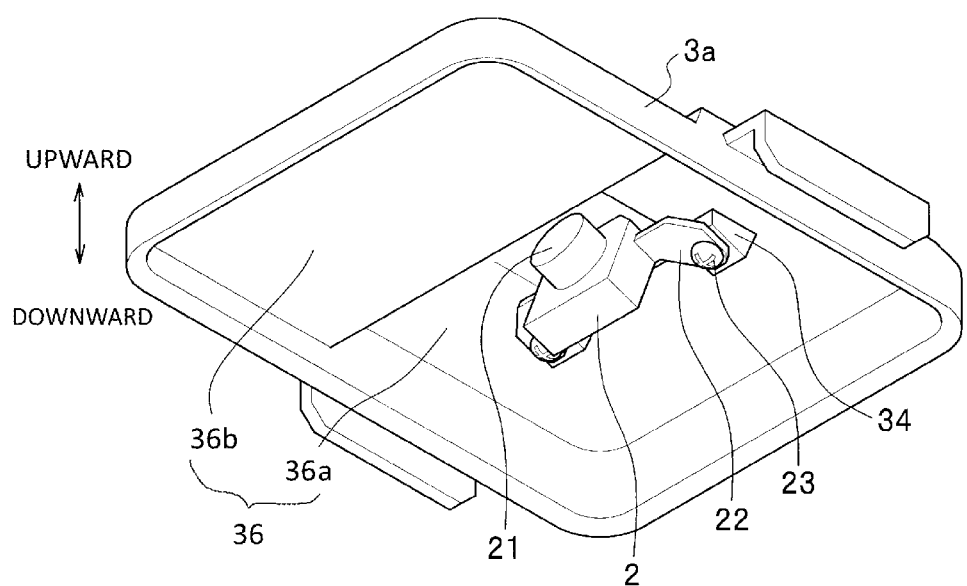
FIG. 7 is a perspective view showing a state in which a camera main body portion is fixed to a pedestal in FIG. 6A.
Figure 8:
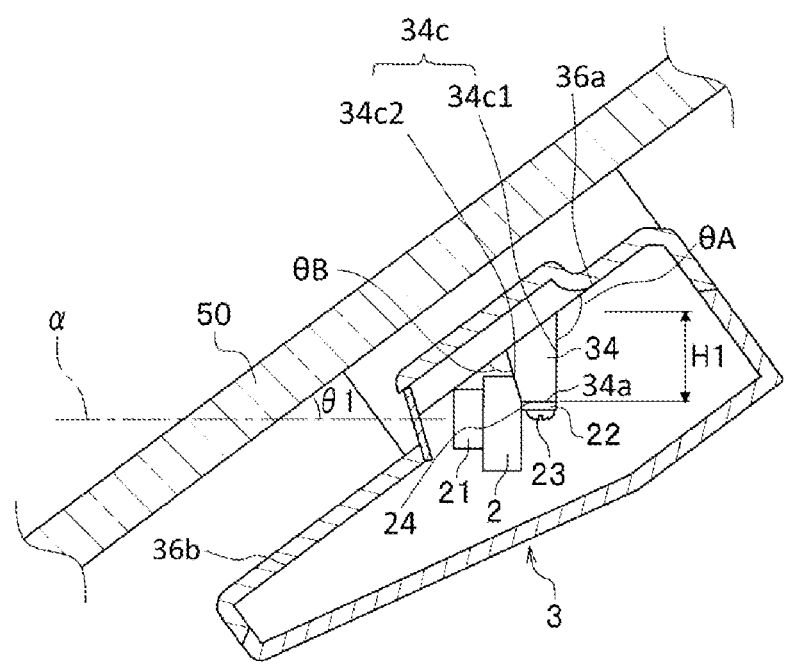
FIG. 8 is an explanatory diagram showing an attached state of the vehicle-mounted camera to a car model in which an angle θ1 of the windshield is large.

As shown in FIGS. 7 and 8, the fixing member 23 is tightened into the fixing member hole 34$b$ in a state in which the protrusion fixing portion 22 is in contact with the pedestal flat face 34$a$. Then, when the vehicle-mounted camera 100 is attached, the camera main body portion 2 is fixed to the pedestal 34 with the optical axis of the lens unit 21 facing the reference attachment direction.

The pedestal 34 includes the pedestal flat face 34$a$ and a side face 34$c$ that connects the pedestal flat face 34$a$ and the lower face rear portion 36$a$. A first angle $\theta A$ defined by a rear side face 34$c$1 of the pedestal 34, which is a face facing away from a photographing direction of the camera main body portion 2, and the lower face rear portion 36$a$ is larger than about 90 degrees, for example. A second angle $\theta B$ defined by a front side face 34$c$2 of the pedestal 34, which is a surface facing toward the photographing direction of the camera main body portion 2, and the lower face rear portion 36$a$ is smaller than about 90 degrees, for example, in this example. A sum of the first angle $\theta A$ and the second angle $\theta B$ is preferably larger than 180 degrees. That is, the pedestal 34 has a shape in which the width in the front-back direction increases toward the lower face rear portion 36$a$. However, the second angle $\theta B$ may be an angle larger than 90 degrees, for example.

Attachment of the vehicle-mounted camera 100 to various car models is explained with reference to FIGS. 8 and 9.

Figure 9:
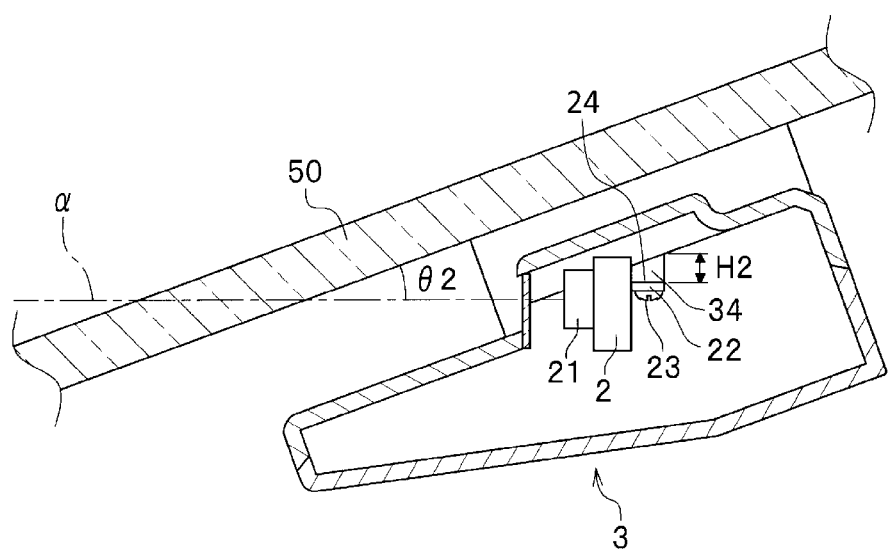
FIG. 9 is an explanatory diagram showing an attached state of the vehicle-mounted camera to a car model in which an angle θ2 of the windshield is small.

Note that, in FIGS. 8 and 9, a reference attachment direction $\alpha$ is indicated by an alternate long and short dash line. In FIGS. 8 and 9, illustration of the attachment member 60 is omitted.

As shown in FIGS. 8 and 9, angles $\theta 1$ and $\theta 2$ of the windshield 50 are often different for various car models. The angle $\theta 1$ of the windshield 50 of one car model shown in FIG. 8 is large (FIG. 8). On the other hand, the angle $\theta 2$ of the windshield 50 of another car model is small (FIG. 9). As shown in FIGS. 8 and 9, the angle of the windshield 50 refers to an angle between the horizontal direction and the windshield 50.

It is desirable that, when the vehicle-mounted camera 100 is attached, the optical axis of the lens unit 21 points in the reference attachment direction $\alpha$. The reference attachment direction $\alpha$ is set in advance with reference to the horizontal direction with respect to the windshield 50. In the present preferred embodiment, the reference attachment direction $\alpha$ is the horizontal direction.

The pedestal 34 has an excess margin before it is partially cut in a production process. The upper case 3$a$ before the pedestal 34 is cut is referred to as an intermediate member in this specification. The size of the pedestal 34 before it is cut is determined considering a largest windshield angle of a car model to which the vehicle-mounted camera 100 is to be attached. According to the angle of the windshield 50 of a car model to which the vehicle-mounted camera 100 is attached, the pedestal 34 is cut such that the pedestal flat face 34$a$ is parallel or substantially parallel to the reference attachment direction $\alpha$ in this case. The camera flat face 24 shown in FIGS. 8 and 9 is parallel or substantially parallel to the optical axis of the lens unit 21, but other configurations in which the camera flat face 24 is not parallel to the optical axis of the lens unit 21 may be used. The pedestal 34 is cut such that the pedestal flat face 34$a$ has a certain angle to the reference attachment direction in that case. The side face of the pedestal 34 may be cut such that the pedestal 34 has an appropriate thickness (FIG. 9).

For example, when cutting of the pedestal 34 in the case of the angle $\theta 1$ of the windshield 50 and cutting of the pedestal 34 in the case of the smaller angle $\theta 2$ of the windshield 50 are compared, the pedestal 34 is cut more when the angle is $\theta 2$. That is, in the pedestal 34, heights H1 and H2 of the pedestal 34 and the inclination of the pedestal flat face 34$a$ are different according to the angles $\theta 1$ and $\theta 2$ of the windshield 50. Consequently, the housing 3 is configured to be applied to various car models.

Note that, when there is space in the size in the longitudinal direction of the lens window portion opening portion 32, even if the inclination angle of the windshield 50 is different, the height of the pedestal 34 sometimes does not have to be changed. This is because the visual field of the lens unit 21 is not blocked. However, even in such a case, the inclination angle of the pedestal flat face 34$a$ is preferably changed according to the inclination angle of the windshield 50.

The cutting margin of the pedestal 34 is a portion exceeding the height H1 if the angle of the windshield 50 is $\theta 1$. The cutting margin of the pedestal 34 is a portion exceeding the height H2 if the angle of the windshield 50 is $\theta 2$. That is, the cutting margin of the pedestal 34 is the portion exceeding the heights H1 and H2 of the pedestal 34 based on the angles $\theta 1$ and $\theta 2$ of the windshield 50.

A non-limiting example of a method of manufacturing the vehicle-mounted camera housing according to a preferred embodiment of the present invention is explained below in detail with reference to FIG. 10 (see FIG. 6 as appropriate).

Figure 10:
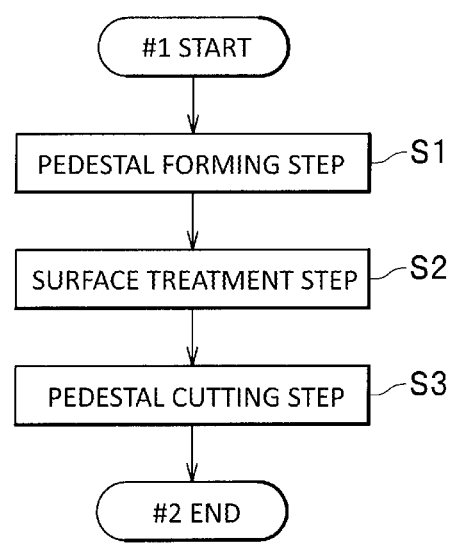
FIG. 10 is a flowchart for explaining a procedure of a method of manufacturing a vehicle-mounted camera housing according to a preferred embodiment of the present invention.

As shown in FIG. 10, in the method of manufacturing the vehicle-mounted camera housing, a pedestal forming step S1, a surface treatment step S2, and a pedestal cutting step S3 are executed in order.

First, in the pedestal forming step S1, the housing 3 is preferably formed by casting, for example. When aluminum or an aluminum alloy is selected as the material of the housing 3, a die-cast method is preferably used as a method of casting. However, the method of casting is not limited to this.

In the die-cast method, first, a mold is prepared. As the mold, a mold for casting the cover housing 3$a$ and a mold for casting the base housing 3$b$ are provided. Each of the molds preferably includes two or more partial molds. A cavity is defined by the inside of the mold when the partial molds are combined. The cavities of the molds respectively have shapes that are the same or substantially the same as the cover housing 3$a$ and the base housing 3$b$. As the housing 3, various shapes may be used. Therefore, various shapes are conceivable as the shapes of the internal cavities of the molds. However, a tabular cavity portion for forming the top plate portion 35 is preferably provided. The tabular cavity portion is a cavity sandwiched by the inner surfaces of the pair of molds that are opposed to each other. The tabular cavity portion is a portion of the cavity having a dimension in which the distance in the front-back direction and the width direction in the cover housing 3$a$ is larger than the space between the inner surfaces of the pair of molds.

In the casting process, the aluminum or aluminum alloy is melted into a fluidized state and injected into each of the cavities of the molds while being applied with pressure. After the aluminum or aluminum alloy is solidified, the combined molds are separated. Intermediate members having shapes that approximate the completed shapes of the respective members are obtained. Each of the intermediate members includes at least the top plate portion 35. The intermediate member may include the lens window portion 31 and the lens window portion opening 32. However, the lens window portion 31 and the lens window portion opening 32 are not essential. When the intermediate member does not include the lens window portion opening 32, the lens window portion opening 32 preferably is formed later by cutting process. Note that, in the following explanation, for convenience, the intermediate members are also referred to as the cover housing 3a and the base housing 3b.

One of the inner surfaces of the molds sandwiching the tabular cavity portion includes a recessed portion. During the die-casting, melted aluminum or aluminum alloy is poured into the recessed portion. After solidification of the aluminum or aluminum alloy, the aluminum or aluminum alloy poured into the recessed portion changes to a projected portion. The projected portion is subjected to cutting in the pedestal cutting step S3 explained below to form the pedestal 34. The depth of the recessed portion of the mold is larger than the height of the pedestal 34. The projected portion obtained from the recessed portion is higher than the pedestal 34.

Note that, as the aluminum or aluminum alloy preferably used as the material in the present preferred embodiment, for example, any aluminum or aluminum alloy may be used. Aluminum or aluminum alloys which meet the standards for casting by the Aluminum Association, however, are preferable. As the material, other than aluminum or aluminum alloy, a resin material such as polystyrene resin may also be used.

Subsequently, in the surface treatment step S2, a surface treatment such as an anodizing treatment is preferably applied to the housing 3. Consequently, corrosion resistance and abrasion resistance of the housing 3 is improved.

The surface treatment step S2 may also include a painting step after the surface treatment. As the paint, a polyurethane resin and epoxy resin may be used. However, the paint is not limited to these kinds of resins. In the present preferred embodiment, a polyurethane-based resin paint is preferably used. The paint is preferably applied to the entire outer surface of the housing 3. However, a portion not applied with the paint may be left in the outer surface of the housing 3. More than half of the lower face 36 of the top plate portion 35 is preferably painted. The corrosion resistance and the abrasion resistance is further improved by the painting. By applying black paint to the inner and the outer side portion of the cover housing 3a, it is possible to prevent irregular reflections of sunlight and perform highly accurate photographing. Note that, in a preferred embodiment of the method of manufacturing the vehicle-mounted camera housing, the surface treatment step S2 may be omitted.

Subsequently, in the pedestal cutting step S3, cutting of the distal end of the projected portion of the cover housing 3a is performed, the pedestal flat face 34a is formed, and the pedestal 34 is obtained. The cutting step may be applied to a portion other than the distal end of the projected portion. As an angle of the pedestal flat face 34a with respect to the top plate portion 35, a value at which the camera main body portion 2 fixed to the pedestal 34 faces the reference attachment direction is selected. By forming the pedestal flat face 34a by machining, it is possible to obtain many kinds of cover housings 3a having different angles of the pedestal flat face 34a without increasing the types of the molds, which are an expensive component. Windshields to which the housing 3 is attached have various inclination angles for different car models. Therefore, according to various preferred embodiments of the present invention, it is possible to inexpensively supply products configured to be attached to a large number of car models.

The fixing member hole 34b is preferably provided by machining such as cutting, for example. A direction in which the fixing member hole 34b extends with respect to the top plate portion 35 is also different according to the inclination of the windshield 50. As explained above, the pedestal 34 has a shape in which the width in the front-back direction increases towards the lower face rear portion 36a. Therefore, even if the extending direction of the fixing member hole 34b is different, the fixing member hole 34b does not extend through the rear side face 34c1 and the front side face 34c2 of the pedestal 34. The camera main body portion 2 is thus stably supported. When the intermediate member does not include the lens window portion opening 32, the lens window portion opening 32 is also preferably provided by machining, for example.

Note that, after the surface treatment step S2 is performed, the paint applied to the pedestal 34 is cut in the pedestal cutting step S3. Therefore, a metal surface is exposed on the pedestal flat face 34a. Metal surfaces are exposed in both portions where the pedestal flat face 34a and the protrusion fixing portion 22 are in contact. Therefore, compared with fixing to a painted surface, the accuracy of a direction of the camera main body portion 2 is increased. Heat generated in the camera main body portion 2 is easily radiated through the protrusion fixing portion 22. Further, since the protrusion fixing portion 22 is also configured to ground the camera main body portion 2, it is possible to more surely use the vehicle-mounted camera 100.

Note that the surface treatment step S2 or the painting step may be carried out after the pedestal cutting step S3. By using such a manufacturing method, for example, dust such as chips that occur during cutting and that cannot be fully removed by cleaning after the cutting step are covered by a subsequent coating step.

As the directions of the pedestal flat face 34a and the fixing member hole 34b, it is most desirable to select optimum values according to respective car models. However, in that case, different kinds of the cover housings 3a are provided based on the number of car models. Management and distribution of products are complicated. Therefore, several values are provided as the inclination angle of the windshield 50. A plurality of kinds of vehicle-mounted cameras 100 including the pedestal flat faces 34a inclined in directions corresponding to the windshield angles are prepared in advance. In this case, it is possible to use a method of selecting, according to the inclination angle of the windshield 50 of a target vehicle for the vehicle-mounted camera 100, a vehicle-mounted camera 100 of a type in which the deviation of the direction of the optical axis from the original direction is the smallest.

For example, as the inclination angle of the windshield 50, four inclination angles having different values at an interval of about 3 degrees, e.g., 19°, 22°, 25°, and 28° are assumed, for example. Four directions that the pedestal flat face 34a should have are respectively determined in association with the assumed inclination angles. The pedestal 34 preferably is machined to produce four cover housings 3a having different directions of the pedestal flat portions 34a, and four types of the vehicle-mounted cameras 100 are prepared using these cover housings 3a, for example. In the attachment to the target vehicle, a vehicle-mounted camera having the most appropriate inclination angle is selected with reference to an inclination angle of the windshield 50 of the target vehicle such that the direction of the optical axis of the attached vehicle-mounted camera becomes closest to the reference attachment direction. If this method is selected, it is possible to significantly reduce or prevent an increase in the number of types of cover housings 3a.

Note that the directions of the pedestal flat face 34a and the fixing member hole 34b are determined with reference to the inclination angle of the windshield 50, a relative direction of the optical axis of the lens unit 21 with respect to the camera flat face 24, relative directions of the pedestal flat face 34a and the upper face of the top plate portion 35, relative directions of the top plate portion 35 and the surface of the windshield 50 in a state in which the vehicle-mounted camera 100 is attached to the windshield 50, a photographing direction in which the camera main body portion 2 photographs a scene, and a tolerance allowed for the photographing direction. Usually, the directions of the pedestal flat face 34a and the fixing member hole 34b are determined by a simple calculation including addition and subtraction of angles. The pedestal cutting step S3 is carried out using the directions determined in advance in this manner.

Since the calculation for determining the directions is simple, the directions may be calculated immediately before the machining.

When using a method as explained above, a maximum error of about 3 degrees, for example, is allowed for the reference attachment direction that the camera main body portion 2 should face. However, the present invention may also include a configuration in which the deviation is corrected by digital processing.

In such a vehicle-mounted camera 100, an image picked up by the camera main body portion 2 is electronically shifted by the processing circuit element 4 included in the circuit board 1 and the deviation of the angle is corrected. A correction amount is calculated based on an actual inclination angle of the windshield 50 and a selected inclination angle of the flat portion 34a of the cover housing 3a and stored in the processing circuit element 4 before the vehicle attached with the camera runs on the roads.

The calculation is explained in detail. The processing circuit element 4 includes an image processing program that uses a direction error in processing an image photographed by the camera main body portion 2. The camera main body portion 2 of the vehicle-mounted camera 100 after being attached to the windshield 50 of the target vehicle photographs a target object present in a known direction, which is a direction known with respect to the target vehicle, and causes the processing circuit element 4 to acquire an image. The processing circuit element 4 recognizes an on-image position, which is the position of the target object in the image. The processing circuit element 4 recognizes an original position, which is a position where the target image should originally be present in the image, based on the known direction. The processing circuit element 4 calculates a direction error using the original position and the on-image position.

When this method is used, it is possible to correct slight deviations of an attachment direction that could occur when attaching the vehicle-mounted camera 100 to the windshield 50.

The method of manufacturing the vehicle-mounted camera housing and the housing 3 according to the present invention are not limited to the preferred embodiments explained above and can be modified without departing from the concept of the present invention.

For example, as a preferred embodiment of the present invention, it is also possible to use a configuration in which the distal end of the lens unit 2 reaches the outer side of the lens window portion opening 32.

The positions, the number, and the shapes of the pedestals 34 are not particularly limited as long as the camera main body portion 2 is fixed toward the reference attachment direction. For example, one or three or more pedestals 34 may be provided. The pedestals 34 may have a truncated cone shape, for example. The pedestals 34 may be located near the lens window portion opening 32 on the inner side of the cover housing 3a, for example. Further, the pedestals 34 may be located on the inner side of the base housing 3b rather than on the inner side of the cover housing 3a, for example. Similarly, three or more camera flat faces 24 may be provided, for example.

Each of the pedestals 34 does not need to include only one pedestal flat face 34a. For example, it is also possible to select a structure in which one pedestal 34 includes two or more pedestal flat faces 34a divided by grooves among the pedestal flat faces 34a. Similarly, it is also possible to select a structure in which two or more camera flat faces 24 divided by groove structures among the camera flat faces 24 are in contact with the pedestal flat face 34a on one pedestal 34.

A vehicle-mounted apparatus in which the housing 3 is used is not limited to the vehicle-mounted camera 100. For example, the housing 3 can be used in a vehicle-mounted apparatus such as a rain sensor, a millimeter wave radar sensor, and a laser radar sensor.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A method of manufacturing a vehicle-mounted camera including a cover housing including a top plate portion, a camera main body portion fixed to the cover housing, and a circuit board connected to the camera main body portion, the vehicle-mounted camera configured to be attached to a windshield and used in a posture in which the top plate portion extends along the windshield, the method comprising the steps of:
   preparing a set of molds including two or more partial molds configured to be combined to define an internal cavity including a tabular portion sandwiched by inner surfaces of the partial molds;
   combining the partial molds to define the internal cavity;
   injecting a material in a fluidized state into the internal cavity;
   solidifying the material;
   separating the combined partial molds and taking out an intermediate member;
   machining the intermediate member to obtain the cover housing;
   fixing the camera main body portion to the cover housing with a fixing member; and
   connecting the circuit board to the camera main body;
wherein
   the camera main body portion includes a lens unit;
   the top plate portion of the cover housing includes a pedestal extending downward;
   the camera main body portion includes a camera flat face;
   the inner surfaces of the partial molds that sandwich the tabular portion in the internal cavity are surfaces of the partial molds that are different from each other;
   one of the inner surfaces includes a recessed portion;
   a depth of the recessed portion measured with reference to a flat portion of the one of the inner surfaces is larger than a height of the pedestal;

the machining step includes cutting a distal end of the pedestal to define a pedestal flat face facing a predetermined direction;

in a state in which the camera main body portion is fixed to the cover housing, the pedestal flat face and the camera flat face are in contact with each other; and the predetermined direction is determined with reference to an inclination angle of the windshield of a target vehicle body, a relative direction of an optical axis of the lens unit with respect to the camera flat face, relative directions of the pedestal flat face and an upper face of the top plate portion, and relative directions of the top plate portion and a surface of the windshield in a state in which the vehicle-mounted camera is attached to the windshield.

2. The method of manufacturing the vehicle-mounted camera according to claim 1, wherein the predetermined direction is determined with further reference to a photographing direction in which the camera main body portion photographs a scene and a tolerance allowed for the photographing direction.

3. The method of manufacturing the vehicle-mounted camera according to claim 1, wherein the camera main body portion further includes a protrusion fixing portion extending in a direction away from the optical axis;

both of the material and the protrusion fixing portion include aluminum or an aluminum alloy;

the camera flat face is located on a surface of the protrusion fixing portion; and metal surfaces of both of the pedestal flat face and the camera flat face are exposed.

4. The method of manufacturing the vehicle-mounted camera according to claim 2, wherein the camera main body portion further includes a protrusion fixing portion extending in a direction away from the optical axis;

both of the material and the protrusion fixing portion include aluminum or an aluminum alloy;

the camera flat face is located on a surface of the protrusion fixing portion; and metal surfaces of both of the pedestal flat face and the camera flat face are exposed.

5. The method of manufacturing the vehicle-mounted camera according to claim 1, further comprising the steps of:

determining a plurality of inclination angles for a plurality of windshields with different inclination angles;

determining a plurality of predetermined directions corresponding to the plurality of the inclination angles;

preparing a plurality of vehicle-mounted cameras corresponding to the plurality of predetermined directions;

determining an attachment target inclination angle corresponding to the inclination angle of the windshield of the target vehicle body to which the vehicle-mounted camera is attached;

selecting an attachment target direction from the plurality of predetermined directions with reference to the attachment target inclination angle;

selecting an attachment target vehicle-mounted camera with the attachment target direction as the predetermined direction; and attaching the attachment target vehicle-mounted camera to the windshield of the target vehicle body.

6. The method of manufacturing the vehicle-mounted camera according to claim 2, further comprising:

determining a plurality of inclination angles for a plurality of windshields with different inclination angles;

determining a plurality of predetermined directions corresponding to the plurality of the inclination angles;

preparing a plurality of vehicle-mounted cameras corresponding to the plurality of predetermined directions;

determining an attachment target inclination angle corresponding to the inclination angle of the windshield of the target vehicle body to which the vehicle-mounted camera is attached;

selecting an attachment target direction from the plurality of predetermined directions with reference to the attachment target inclination angle;

selecting an attachment target vehicle-mounted camera with the attachment target direction as the predetermined direction; and attaching the attachment target vehicle-mounted camera to the windshield of the target vehicle body.

7. The method of manufacturing the vehicle-mounted camera according to claim 3, further comprising:

determining a plurality of inclination angles for a plurality of windshields with different inclination angles;

determining a plurality of predetermined directions corresponding to the plurality of the inclination angles;

preparing a plurality of vehicle-mounted cameras corresponding to the plurality of predetermined directions;

determining an attachment target inclination angle corresponding to the inclination angle of the windshield of the target vehicle body to which the vehicle-mounted camera is attached;

selecting an attachment target direction from the plurality of predetermined directions with reference to the attachment target inclination angle;

selecting an attachment target vehicle-mounted camera with the attachment target direction as the predetermined direction; and attaching the attachment target vehicle-mounted camera to the windshield of the target vehicle body.

8. The method of manufacturing the vehicle-mounted camera according to claim 4, further comprising:

determining a plurality of inclination angles for a plurality of windshields with different inclination angles;

determining a plurality of predetermined directions corresponding to the plurality of the inclination angles;

preparing a plurality of vehicle-mounted cameras corresponding to the plurality of predetermined directions;

determining an attachment target inclination angle corresponding to the inclination angle of the windshield of the target vehicle body to which the vehicle-mounted camera is attached;

selecting an attachment target direction from the plurality of predetermined directions with reference to the attachment target inclination angle;

selecting an attachment target vehicle-mounted camera with the attachment target direction as the predetermined direction; and attaching the attachment target vehicle-mounted camera to the windshield of the target vehicle body.

9. The method of manufacturing the vehicle-mounted camera according to claim 1, wherein the circuit board includes a processing circuit configured or programmed to electronically process an image photographed by the camera main body portion;

the processing circuit includes an image processing program that uses a direction error in processing the image photographed by the camera main body portion;

after the camera main body portion is attached to the windshield of the target vehicle body, photographing a target object present in a known direction with respect to the vehicle body and causing the processing circuit to acquire an image;

recognizing an on-image position of the target object on the image with the processing circuit;

recognizing an original position where the target object should originally be present on the image with the processing circuit based on the known direction; and calculating the direction error using the original position and the on-image position with the processing circuit.

10. The method of manufacturing the vehicle-mounted camera according to claim 2, wherein the circuit board includes a processing circuit configured or programmed to electronically process an image photographed by the camera main body portion;

the processing circuit includes an image processing program that uses a direction error in processing the image photographed by the camera main body portion;

after the camera main body portion is attached to the windshield of the target vehicle body, photographing a target object present in a known direction with respect to the vehicle body and causing the processing circuit to acquire an image;

recognizing an on-image position of the target object on the image with the processing circuit;

recognizing an original position where the target object should originally be present on the image with the processing circuit based on the known direction; and calculating the direction error using the original position and the on-image position with the processing circuit.

11. The method of manufacturing the vehicle-mounted camera according to claim 3, wherein the circuit board includes a processing circuit configured or programmed to electronically process an image photographed by the camera main body portion;

the processing circuit includes an image processing program that uses a direction error in processing the image photographed by the camera main body portion;

after the camera main body portion is attached to the windshield of the target vehicle body, photographing a target object present in a known direction with respect to the vehicle body and causing the processing circuit to acquire an image;

recognizing an on-image position of the target object on the image with the processing circuit;

recognizing an original position where the target object should originally be present on the image with the processing circuit based on the known direction; and calculating the direction error using the original position and the on-image position with the processing circuit.

12. The method of manufacturing the vehicle-mounted camera according to claim 4, wherein the circuit board includes a processing circuit configured or programmed to electronically process an image photographed by the camera main body portion;

the processing circuit includes an image processing program that uses a direction error in processing the image photographed by the camera main body portion;

after the camera main body portion is attached to the windshield of the target vehicle body, photographing a target object present in a known direction with respect to the vehicle body and causing the processing circuit to acquire an image;

recognizing an on-image position of the target object on the image with the processing circuit;

recognizing an original position where the target object should originally be present on the image with the processing circuit based on the known direction; and calculating the direction error using the original position and the on-image position with the processing circuit.

13. The method of manufacturing the vehicle-mounted camera according to claim 5, wherein the circuit board includes a processing circuit configured or programmed to electronically process an image photographed by the camera main body portion;

the processing circuit includes an image processing program that uses a direction error in processing the image photographed by the camera main body portion;

after the camera main body portion is attached to the windshield of the target vehicle body, photographing a target object present in a known direction with respect to the vehicle body and causing the processing circuit to acquire an image;

recognizing an on-image position of the target object on the image with the processing circuit;

recognizing an original position where the target object should originally be present on the image with the processing circuit based on the known direction; and calculating the direction error using the original position and the on-image position with the processing circuit.

14. The method of manufacturing the vehicle-mounted camera according to claim 6, wherein the circuit board includes a processing circuit configured or programmed to electronically process an image photographed by the camera main body portion;

the processing circuit includes an image processing program that uses a direction error in processing the image photographed by the camera main body portion;

after the camera main body portion is attached to the windshield of the target vehicle body, photographing a target object present in a known direction with respect to the vehicle body and causing the processing circuit to acquire an image;

recognizing an on-image position of the target object on the image with the processing circuit;

recognizing an original position where the target object should originally be present on the image with the processing circuit based on the known direction; and calculating the direction error using the original position and the on-image position with the processing circuit.

15. The method of manufacturing the vehicle-mounted camera according to claim 7, wherein the circuit board includes a processing circuit configured or programmed to electronically process an image photographed by the camera main body portion;

the processing circuit includes an image processing program that uses a direction error in processing the image photographed by the camera main body portion;

after the camera main body portion is attached to the windshield of the target vehicle body, photographing a target object present in a known direction with respect to the vehicle body and causing the processing circuit to acquire an image;

recognizing an on-image position of the target object on the image with the processing circuit;

recognizing an original position where the target object should originally be present on the image with the processing circuit based on the known direction; and calculating the direction error using the original position and the on-image position with the processing circuit.

16. The method of manufacturing the vehicle-mounted camera according to claim 8, wherein the circuit board includes a processing circuit configured or programmed to electronically process an image photographed by the camera main body portion;

the processing circuit includes an image processing program that uses a direction error in processing the image photographed by the camera main body portion;

after the camera main body portion is attached to the windshield of the target vehicle body, photographing a target object present in a known direction with respect to the vehicle body and causing the processing circuit to acquire an image;

recognizing an on-image position of the target object on the image with the processing circuit;

recognizing an original position where the target object should originally be present on the image with the processing circuit based on the known direction; and calculating the direction error using the original position and the on-image position with the processing circuit.

17. The method of manufacturing the vehicle-mounted camera according to claim 1, further comprising:

painting a surface of the intermediate member corresponding to at least the upper surface of the top plate portion; wherein the machining step includes cutting at least a portion of the painted surface of the intermediate member; and the painting step is executed before the camera main body portion is fixed to the cover housing by the fixing member.

18. The method of manufacturing the vehicle-mounted camera according to claim 2, further comprising:

painting a surface of the intermediate member corresponding to at least the upper surface of the top plate portion; wherein the machining step includes cutting at least a portion of the painted surface of the intermediate member; and the painting step is executed before the camera main body portion is fixed to the cover housing by the fixing member.

19. The method of manufacturing the vehicle-mounted camera according to claim 3, further comprising:

painting a surface of the intermediate member corresponding to at least the upper surface of the top plate portion; wherein the machining step includes cutting at least a portion of the painted surface of the intermediate member; and the painting step is executed before the camera main body portion is fixed to the cover housing by the fixing member.

20. The method of manufacturing the vehicle-mounted camera according to claim 7, further comprising:

painting a surface of the intermediate member corresponding to at least the upper surface of the top plate portion; wherein the machining step includes cutting at least a portion of the painted surface of the intermediate member; and the painting step is executed before the camera main body portion is fixed to the cover housing by the fixing member.

21. The method of manufacturing the vehicle-mounted camera according to claim 16, further comprising:

painting a surface of the intermediate member corresponding to at least the upper surface of the top plate portion; wherein the machining step includes cutting at least a portion of the painted surface of the intermediate member; and the painting step is executed before the camera main body portion is fixed to the cover housing by the fixing member.

22. The method of manufacturing the vehicle-mounted camera according to claim 1, further comprising:

painting more than half of a lower surface of the top plate portion.

23. The method of manufacturing the vehicle-mounted camera according to claim 2, further comprising:

painting more than half of a lower surface of the top plate portion.

24. The method of manufacturing the vehicle-mounted camera according to claim 3, further comprising:

painting more than half of a lower face of the top plate portion.

25. The method of manufacturing the vehicle-mounted camera according to claim 8, further comprising:

painting more than half of a lower face of the top plate portion.

26. The method of manufacturing the vehicle-mounted camera according to claim 15, further comprising:

painting a surface of the intermediate member corresponding to at least the upper face of the top plate portion; and painting more than half of a lower face of the top plate portion; wherein the machining step includes cutting at least a portion of the painted surface of the intermediate member; and the painting step is executed before the camera main body portion is fixed to the cover housing by the fixing member portion.

27. The method of manufacturing the vehicle-mounted camera according to claim 21, further comprising:

painting more than half of a lower face of the top plate portion.

28. The method of manufacturing the vehicle-mounted camera according to claim 1, further comprising:

painting a surface of the intermediate member corresponding to at least the upper face of the top plate portion; wherein the machining step includes cutting at least a portion of the painted surface of the intermediate member;

the painting step is executed before the camera main body portion is fixed to the cover housing by the fixing member; and the machining step is carried out after the painting step.

29. The method of manufacturing the vehicle-mounted camera according to claim 2, further comprising:

painting a surface of the intermediate member corresponding to at least the upper face of the top plate portion; wherein the machining step includes cutting at least a portion of the painted surface of the intermediate member;

the painting step is executed before the camera main body portion is fixed to the cover housing by the fixing member; and the machining step is carried out after the painting step.

30. The method of manufacturing the vehicle-mounted camera according to claim 3, further comprising:

painting a surface of the intermediate member corresponding to at least the upper face of the top plate portion; wherein the machining step includes cutting at least a portion of the painted surface of the intermediate member;

the painting step is executed before the camera main body portion is fixed to the cover housing by the fixing member; and the machining step is carried out after the painting step.

31. The method of manufacturing the vehicle-mounted camera according to claim 7, further comprising:
    painting a surface of the intermediate member corresponding to at least the upper face of the top plate portion; wherein
    the machining step includes cutting at least a portion of the painted surface of the intermediate member;
    the painting step is executed before the camera main body portion is fixed to the cover housing by the fixing member; and
    the machining step is carried out after the painting step.

32. The method of manufacturing the vehicle-mounted camera according to claim 9, further comprising:
    painting a surface of the intermediate member corresponding to at least the upper face of the top plate portion; wherein
    the machining step includes cutting at least a portion of the painted surface of the intermediate member;
    the painting step is executed before the camera main body portion is fixed to the cover housing by the fixing member; and
    the machining step is carried out after the painting step.

33. The method of manufacturing the vehicle-mounted camera according to claim 10, further comprising:
    painting a surface of the intermediate member corresponding to at least the upper face of the top plate portion; wherein
    the machining step includes cutting at least a portion of the painted surface of the intermediate member;
    the painting step is executed before the camera main body portion is fixed to the cover housing by the fixing member; and
    the machining step is carried out after the painting step.

34. The method of manufacturing the vehicle-mounted camera according to claim 13, further comprising:
    painting a surface of the intermediate member corresponding to at least the upper face of the top plate portion; wherein
    the machining step includes cutting at least a portion of the painted surface of the intermediate member;
    the painting step is executed before the camera main body portion is fixed to the cover housing by the fixing member; and
    the machining step is carried out after the painting step.

35. The method of manufacturing the vehicle-mounted camera according to claim 15, further comprising:
    painting a surface of the intermediate member corresponding to at least the upper face of the top plate portion; wherein
    the machining step includes cutting at least a portion of the painted surface of the intermediate member;
    the painting step is executed before the camera main body portion is fixed to the cover housing by the fixing member; and
    the machining step is carried out after the painting step.

36. The method of manufacturing the vehicle-mounted camera according to claim 16, further comprising:
    painting a surface of the intermediate member corresponding to at least the upper face of the top plate portion; wherein
    the machining step includes cutting at least a portion of the painted surface of the intermediate member;
    the painting step is executed before the camera main body portion is fixed to the cover housing by the fixing member; and
    the machining step is carried out after the painting step.

37. The method of manufacturing the vehicle-mounted camera according to claim 16, further comprising:
    painting a surface of the intermediate member corresponding to at least the upper face of the top plate portion; wherein
    the machining step includes cutting at least a portion of the painted surface of the intermediate member;
    the painting step is executed before the camera main body portion is fixed to the cover housing by the fixing member; and
    the machining step is carried out after the painting step.

38. The method of manufacturing the vehicle-mounted camera according to claim 1, wherein
    a first angle defined by a rear side main body surface of the pedestal on an opposite side of a photographing direction of the camera main body portion and a lower face of the top plate portion is larger than 90 degrees; and
    a sum of the first angle and a second angle defined by a front side surface of the pedestal in the photographing direction of the camera main body portion and the lower face of the top plate portion is larger than 180 degrees.

39. The method of manufacturing the vehicle-mounted camera according to claim 2, wherein
    a first angle defined by a rear side main body surface of the pedestal on an opposite side of a photographing direction of the camera main body portion and a lower face of the top plate portion is larger than 90 degrees; and
    a sum of the first angle and a second angle defined by a front side surface of the pedestal in the photographing direction of the camera main body portion and the lower face of the top plate portion is larger than 180 degrees.

40. The method of manufacturing the vehicle-mounted camera according to claim 3, wherein
    a first angle defined by a rear side surface of the pedestal on an opposite side of a photographing direction of the camera main body portion and a lower face of the top plate portion is larger than 90 degrees; and
    a sum of the first angle and a second angle defined by a front side surface of the pedestal in the photographing direction of the camera main body portion and the lower face of the top plate portion is larger than 180 degrees.

41. The method of manufacturing the vehicle-mounted camera according to claim 7, wherein
    a first angle defined by a rear side main body surface of the pedestal on an opposite side of a photographing direction of the camera main body portion and a lower face of the top plate portion is larger than 90 degrees; and
    a sum of the first angle and a second angle defined by a front side surface of the pedestal in the photographing direction of the camera main body portion and the lower face of the top plate portion is larger than 180 degrees.

42. The method of manufacturing the vehicle-mounted camera according to claim 9, wherein
    a first angle defined by a rear side surface of the pedestal on an opposite side of a photographing direction of the camera main body portion and a lower face of the top plate portion is larger than 90 degrees; and a sum of the first angle and a second angle defined by a front side surface of the pedestal in the photographing direction of the camera main body portion and the lower face of the top plate portion is larger than 180 degrees.

43. The method of manufacturing the vehicle-mounted camera according to claim 10, wherein a first angle defined by a rear side surface of the pedestal on an opposite side of a photographing direction of the camera main body portion and a lower face of the top plate portion is larger than 90 degrees; and a sum of the first angle and a second angle defined by a front side surface of the pedestal in the photographing direction of the camera main body portion and the lower face of the top plate portion is larger than 180 degrees.

44. The method of manufacturing the vehicle-mounted camera according to claim 13, wherein a first angle defined by a rear side surface of the pedestal on an opposite side of a photographing direction of the camera main body portion and a lower face of the top plate portion is larger than 90 degrees; and a sum of the first angle and a second angle defined by a front side surface of the pedestal in the photographing direction of the camera main body portion and the lower face of the top plate portion is larger than 180 degrees.

45. The method of manufacturing the vehicle-mounted camera according to claim 15, wherein a first angle defined by a rear side surface of the pedestal on an opposite side of a photographing direction of the camera main body portion and a lower face of the top plate portion is larger than 90 degrees; and a sum of the first angle and a second angle defined by a front side surface of the pedestal in the photographing direction of the camera main body portion and the lower face of the top plate portion is larger than 180 degrees.

46. The method of manufacturing the vehicle-mounted camera according to claim 16, wherein a first angle defined by a rear side surface of the pedestal on an opposite side of a photographing direction of the camera main body portion and a lower face of the top plate portion is larger than 90 degrees; and a sum of the first angle and a second angle defined by a front side surface of the pedestal in the photographing direction of the camera main body portion and the lower face of the top plate portion is larger than 180 degrees.

47. The method of manufacturing the vehicle-mounted camera according to claim 21, wherein a first angle defined by a rear side surface of the pedestal on an opposite side of a photographing direction of the camera main body portion and a lower face of the top plate portion is larger than 90 degrees; and a sum of the first angle and a second angle defined by a front side surface of the pedestal in the photographing direction of the camera main body portion and the lower face of the top plate portion is larger than 180 degrees.

48. The method of manufacturing the vehicle-mounted camera according to claim 27, wherein a first angle defined by a rear side surface of the pedestal on an opposite side of a photographing direction of the camera main body portion and a lower face of the top plate portion is larger than 90 degrees; and a sum of the first angle and a second angle defined by a front side surface of the pedestal in the photographing direction of the camera main body portion and the lower face of the top plate portion is larger than 180 degrees.

49. The method of manufacturing the vehicle-mounted camera according to claim 37, wherein a first angle defined by a rear side surface of the pedestal on an opposite side of a photographing direction of the camera main body portion and a lower face of the top plate portion is larger than 90 degrees; and a sum of the first angle and a second angle defined by a front side surface of the pedestal in the photographing direction of the camera main body portion and the lower face of the top plate portion is larger than 180 degrees.

* * * * *